Nov. 17, 1964
L. A. MOE
3,157,153
ULTRASONIC SYSTEMS
Filed Oct. 22, 1962
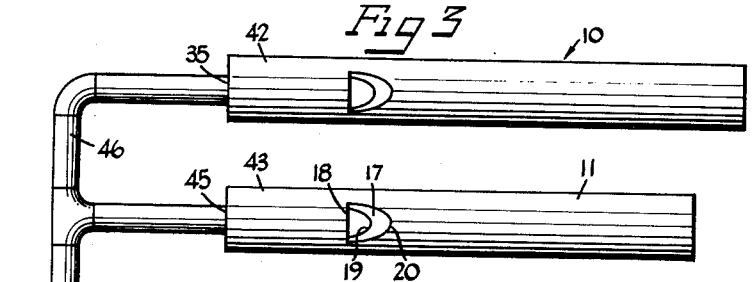
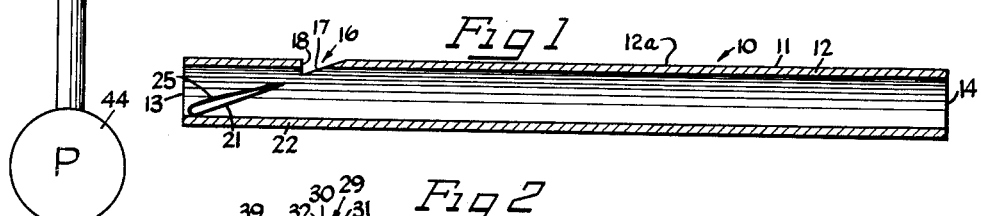
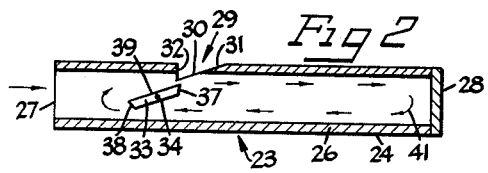
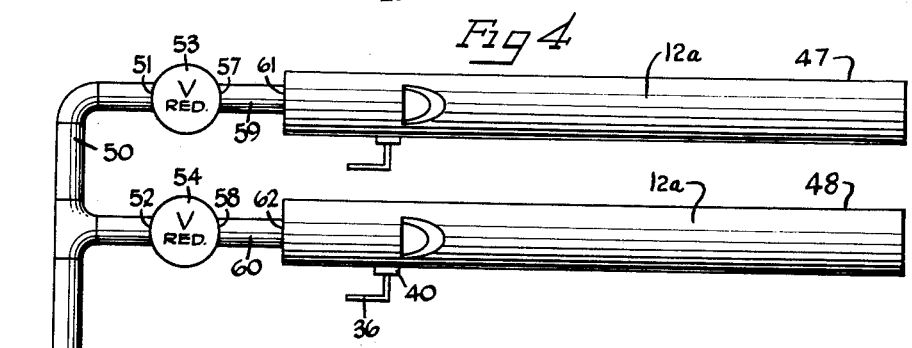
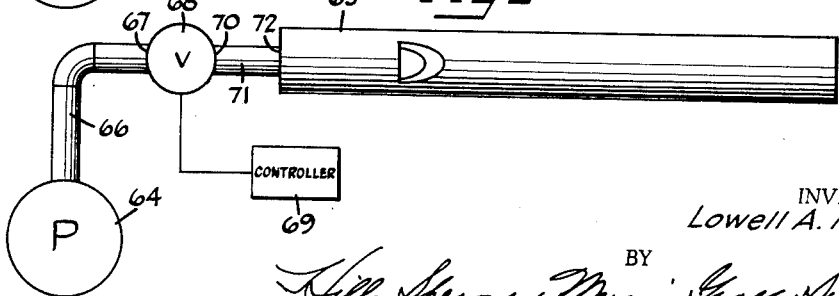
INVENTOR.
Lowell A. Moe
BY
ATTORNEYS

United States Patent Office 3,157,153
Patented Nov. 17, 1964

3,157,153
ULTRASONIC SYSTEMS
Lowell A. Moe, St. Paul, Minn., assignor to F. H. Peavey and Company, Minneapolis, Minn., a corporation of Minnesota
Filed Oct. 22, 1962, Ser. No. 231,965
2 Claims. (Cl. 116—137)

This invention relates generally to ultrasonic systems and more particularly to ultrasonic sound wave generating resonators which are simple in design, inexpensive in manufacture, highly efficient and pneumatically-hydraulically operable.

It has been well established through experimentation that small animals are adversely affected by high frequency sound waves which are beyond the audible frequency spectrum of human beings. For example, the upper limit of the normal audio hearing spectrum for humans is approximately 15,000 cycles per second. Sound waves having frequencies beyond this range cannot be heard by humans, nor do these sound waves have any effect on the nervous system of humans. However, sound waves having ultrasonic frequencies, that is, frequencies beyond approximately 15,000 cycles per second, can be heard by and have a definite adverse effect upon small animals.

There appears to be a direct relation between the size of the cranium or the brain cavity of an animal and the adverse audio hearing spectrum of that animal. For example, an average sized rat can hear sound waves having much higher frequencies than those capable of being heard by a human. An ultrasonic sound wave of approximately 20,000 cycles per second not only can be heard by an average sized rat, but it also has an extremely irritating effect upon the nervous system of the rat. Hearing an ultrasonic sound wave of this frequency level will cause the rat to do almost anything to escape the unbearable sound, and will on occasion even destroy himself to end the suffering. On the other hand, a small field mouse, having a smaller brain cavity is not affected to this degree until the sound waves attain a frequency of approximately 21,000 cycles per second. It appears that a cockroach or a centipede, having still a smaller brain cavity, is not adversely affected until frequencies reaching 27,000 to 28,000 cycles per second are attained. Through theoretical projection, it appears that a mosquito, having an extremely small brain cavity, will not be affected at frequencies less than 37,000 cycles per second.

Important features of this invention are based upon certain discoveries with respect to tolerances or immunities which animals may develop with respect to ultrasonic sound waves. In particular, tests demonstrate that if a small animal is subjected to extremely irritating ultrasonic sound waves over a period of time it will develop a tolerance or a deafness immunity to that particular sound wave as long as the sound wave continues. For example, if an average sized rat is subjected to an ultrasonic sound wave of 20,000 cycles per second it will attempt to escape from the scope of the sound. However, if it cannot escape, after a period of time the sound will have less effect on the rat until finally the rat will develop a deafness immunity to the sound wave. It will lose its immunity if the sound wave is stopped for a period of time, and will have to redevelop it again upon resumption of generation of the sound wave.

It has further been determined that deafness immunity is confined to the particular frequency being generated. A slight variance of the frequency after immunity has developed will re-excite the animal. Therefore, if a frequency of 20,000 cycles per second is generated for a period of time, and a large rat has ultimately developed a deafness immunity to this frequency, a change in frequency to 21,000 cycles per second will cause extreme irritation once again. As the rat thereafter becomes immunized to this higher frequency, a subsequent drop to 20,000 cycles per second will reactivate the irritation.

It has been determined that another method of preventing deafness immunity lies in generating more than one ultrasonic sound wave, the frequency of each being slightly different from the others. In the example of large rats previously discussed, if an ultrasonic sound wave is constantly generated in the order of 20,000 cycles per second and a second wave is constantly generated in the order of approximately 20,500 cycles per second, the rat will not develop a deafness immunity to the resulting sound. This is due to the phenomenon variously known as conflicting vibrations or modulating overtones. A combination of two or more sound waves, the frequencies of which differ slightly, produces an irregular sound, modulating in frequency, and characterized by an overriding regular or irregular beat of varying amplitude. Consequently, since the animal is not subjected merely to two distinct and varying frequencies, but is instead subjected to the conflicting vibrations or modulating overtones, a deafness immunity will not develop and the irritating effect on the brain of the animal will continue as long as the various sound waves are generated.

The use of ultrasonic sound waves to control the activity of undesirable animals in certain locations has been studied in the past. For example, sound waves have been used in an attempt to control the problem of rodent infestation in food storage areas, such as grain elevators. The sound waves are used to move the rodents from the storage area to remote feeding stations, where conventional means of extermination are used.

Conventional practice is to create the ultrasonic sound waves electronically. This method imposes serious limitations in the use of sound waves for this purpose. The electronic equipment necessary is expensive, is relatively sensitive and has an inherently relatively short life span. Also, its use is generally prohibited in many hazardous areas, such as the explosion latent atmosphere of a grain elevator or mill.

The present invention relates to the generation of ultrasonic sound waves by means of pressurized fluid-operated resonators which are simple in design, inexpensive in manufacture, efficient in operation and have a long, useful life span. The invention also contemplates the generation of these waves in such a manner as to preclude deafness immunity to animals having small brain cavities and within whose hearing spectrum the waves are intended.

The present invention provides for an ultrasonic sound wave generator comprising a tubular resonator adapted to produce high frequency sound waves. In a conventional tubular resonator, or whistle, sound waves cannot be generated far beyond the upper limits of the human hearing spectrum because of certain pressure build-ups occurring in the fluid within the resonator due to the higher pressures required to generate ultrasonic frequencies.

Conventional tubular resonators are generally classified as open-cavity or closed-cavity. An open-cavity resonator has two open ends, while a closed-cavity resonator is closed at the end opposite the inlet end. In conventional resonators, the frequency of the sound wave being generated depends on the length of the cavity of the resonator. A closed-cavity resonator will generate a sound wave having a wave length equal to four times the length of the cavity, while the wave length generated by an open-cavity resonator will equal two times the length of the cavity. A slight variation in pressure of the fluid being injected to operate the resonator has little or no effect on the wave length being generated, or on the corresponding frequency.

In order to produce ultrasonic sound waves in a conventional resonator a higher activating fluid pressure is required. Contrary to low frequency generation, a variation in pressure does affect the frequency in ultrasonic frequency generation. A higher pressure generates a higher frequency sound wave. Therefore, in producing ultrasonic sound waves by means of a resonator the pressure of the activating fluid as well as the length of the cavity determine the resulant frequency.

A problem encountered in sustaining oscillation and sound wave generation in a resonator at higher working pressures is a restriction in cleavage at the cleavage point or lip of the resonator. This restriction is caused by a pressure build-up at the cleavage point as the activating fluid pressure increases. Oscillation and sound wave generation collapse as a result of this restriction.

One of the objects of the present invention is to provide a tubular ultrasonic resonator capable of sustaining oscillation at high working pressures. This feature, therefore, makes possible the generation of high frequency sound waves using a very simple device.

Another object of the present invention is to provide a variable frequency ultrasonic sound wave by using only one resonator.

Another object of the present invention is to provide a resonator capable of producing an ultrasonic sound wave using any pressurized fluid as the actuator.

Another object of the present invention is to provide a resonator-generated ultrasonic modulating overtone.

Another object of the present invention is to provide a method of controlling the area of habitation of animals having a small brain cavity by using a variable frequency ultrasonic sound wave.

It is still another object of the present invention to provide a method of rodent control by using an ultrasonic modulating overtone.

Yet another object of the present invention is to provide a method of producing an ultrasonic modulating overtone by using a plurality of resonators of different lengths.

It is still another object of the present invention to provide an ultrasonic modulating overtone by using a plurality of resonators being actuated by fluid at different pressures.

Other objects, features and advantages of the present invention will be apparent from the following detailed description taken in conjunction with the accompanying figures of the drawings.

On the drawings:

FIGURE 1 is an elevational sectional view of an open-cavity tubular resonator of the present invention;

FIGURE 2 is an elevational sectional view of a closed-cavity tubular resonator of the present invention;

FIGURE 3 is a top view of a pair of similar resonators of unequal length connected to a source of a constant pressure fluid;

FIGURE 4 is a top view of a pair of similar resonators of equal length connected to sources of fluid at different pressures; and FIGURE 5 is a top view of a single resonator connected to a source of constant pressure fluid showing a pressure reducing valve inserted in the fluid connector and a valve controller connected to the valve.

As shown on the drawings:

An open-cavity resonator of the present invention is shown generally at 10 in FIGURES 1 and 3. The resonator is characterized by a hollow tubular body 11 having a side wall 12 which is open at both ends as shown at 13 and 14. An aperture generally shown at 16 is formed in the top portion of the side wall and is partially defined by an oblique wall 17 and a vertical wall 18. As best illustrated in FIGURE 1, the aperture 16 is formed by the removal of a portion of the side wall 12 at the top of the body 11. The removed portion, viewed from the side as in FIGURE 1, takes the form of a triangle. As viewed from the top, however, as in FIGURE 3, the portion takes the form of a half-ovoid body. A cleavage point or lip is formed by the oblique wall 17. As best seen in FIGURE 3, the cleavage point also takes a half-ovoid form. The distance between a front edge 19 and a back edge 20 of the oblique wall 17 is determined both by the thickness of the side wall 12 and the angle at which the oblique wall is formed.

Sound waves are generated with an open-cavity tubular resonator by introducing air or other fluid into the resonator at the open end or inlet port 13. As the air travels through the resonator in the direction of the open end or outlet port 14, part of the fluid at the upper portion of the fluid stream comes into contact with the cleavage point or knife-like front edge 19 of the oblique wall 17, where it is split or separated. Some of the cleaved fluid passes out of the resonator through the aperture 16 and the remainder continues moving through the resonator to the outlet port 14. At the front edge 19 the fluid is in a constant process of building up and dropping in pressure. This rapidly modulating pressure variance at the cleavage point produces oscillation of the fluid in the resonator and results thereby in a sound wave.

In producing sound waves in the audible frequency spectrum, that is, below 15,000 cycles per second, the length of the cavity, which is that distance between the vertical wall 18 and the outlet port 14, is equal to one-half of the wave length produced. The pressure of the fluid required to produce frequencies in this range is sufficiently low so that it does not affect the frequency. However, in producing ultrasonic frequencies a higher pressure fluid is required, and this higher pressure does have an effect on the frequency, increasing the frequency as the pressure is increased. It is believed that pressure has an effect on frequency due to its effect on the density of the fluid which in turn affects the velocity of sonic wave travel in the medium. Also the velocity of the flow of the fluid through the resonator may have a substantial effect upon the frequency.

At the higher fluid pressures required for higher frequencies, the pressure build-up at the cleavage point increases to effectively collapse oscillation of the fluid in the resonator, thereby precluding generation of ultrasonic frequencies in a conventional resonator. In order to overcome this collapse in the present invention, a baffle 21 having a flat surface 25 is affixed to a bottom portion 22 of the side wall 12 within the body 11 between the inlet port 13 and the aperture 16. This baffle does not extend to an upper portion 12a of the side wall 12 and effectively directs the high pressure fluid entering through the inlet port 13 in the direction of the cleavage point or front edge 19. The baffle 21 effectively overcomes the problem of pressure build-up and collapse at the cleavage point. Oscillation of the fluid is thereby sustained and a constant ultrasonic sound wave is produced.

A closed-cavity resonator of the present invention is shown generally at 23 in FIGURE 2 and comprises a tubular body portion 24 having a side wall 26 with an open end or inlet port 27 and a closed end 28. An aperture shown generally at 29 is formed in the top portion of the side wall and is similar to the aperture 16 of the open-cavity resonator shown in FIGURE 1. A cleavage point 30 is formed by an oblique wall 31 and takes a half-ovoid form similar to the aperture 16 of the open cavity resonator.

Sound waves are generated in a closed-cavity resonator by introducing air or other fluid into the resonator at the open end or inlet port 27. As the air travels through the resonator in the direction of the closed end 28, part of the fluid at the upper portion of the fluid stream comes into contact with the cleavage point 30, where it is split or separated. Some of the cleaved fluid passes out of the resonator through the aperture 29 and the remainder continues moving through the resonator in a vibrating or oscillating manner to the closed end 28 where the oscillations rebound in the direction of the aperture 29 and mix with the fluid passing out of the aperture 29, thereby producing a sound wave.

In producing sound waves by means of a closed-cavity resonator in the audible frequency spectrum, that is, below 15,000 cycles per second, the length of the cavity, which is that distance between the vertical wall 32 and the closed end 28, is equal to one-quarter of the wave length produced. In the low frequency range the fluid pressure required to produce the sound wave is not sufficiently high to effect the frequency. In producing ultrasonic frequencies, however, a higher pressure fluid is required. The frequency of the sound wave increases as the fluid pressure is increased, and also increases upon a reduction of the length of the cavity.

In conventional closed-cavity resonators, a high fluid pressure and a short cavity will produce a pressure build-up at the cleavage point 30 causing the collapse of oscillations. In order to overcome this collapse in the present invention, an adjustable baffle 33 is carried within a side wall 26 and pivotally mounted on a shaft 34 which is journalled at both ends to the side wall 26. As illustrated in FIGURE 4, the shaft 34 may extend to the exterior of the resonator to form an adjustable arm 36. The baffle has a front and rear edge 37 and 38 and a flat surface 39. A journal 40 of the shaft 34 is suitably adapted to prevent the edges 37 and 38 from coming in contact with the side wall 26. In producing ultrasonic sound waves by means of a closed cavity resonator as modified by the baffle 33, a high pressure fluid is injected into the inlet port 27 where it is directed by the flat surface 39 of the baffle 33 into contact with the cleavage point 30. That portion of the fluid stream which remains in the resonator and moves to the closed end 28 is represented by arrow 41. The fluid rebounds from the wall 28 and moves along the bottom portion of side wall 26 in the direction of the inlet port 27 until it passes between the rear edge 38 of the baffle 33 and the side wall 26. It is there drawn into the fluid stream entering at the inlet port 27 and is admixed with the incoming fluid to be directed once again by the flat surface 39 to the cleavage point 30, thereby precluding collapse of the oscillations at the cleavage point 30.

An embodiment of the present invention capable of producing conflicting vibrations or modulating overtones in the ultrasonic frequency range is shown in FIGURE 3. A pair of tubular resonators having slightly different lengths are shown at 42 and 43. It is understood, of course, that these resonators can be of the open-cavity or closed-cavity type and, of course, one of each type can be used. If an open-cavity resonator is used it will be of the type illustrated in FIGURE 1, and if a closed-cavity type is used it will be of a type illustrated in FIGURE 2. It is important, however, that the resonators used will each produce a sound wave having an ultrasonic frequency slightly less or greater than the frequency produced by the other resonator, the same actuating fluid pressure being applied to each.

A fluid pump 44 capable of supplying a fluid under pressure is connected by means of a pipe 46 or the like to the inlet ports 35 and 45 of the resonator 42 and 43. The sound waves generated by the resonators, being at slightly different frequencies, will produce the ultrasonic modulating overtones which are essential to preclude deafness immunity to small animals within hearing range of the resonators.

Another embodiment of the present invention is shown in FIGURE 4 and comprises a pair of resonators 47 and 48. The resonators are shown having equal lengths and can be of the open-cavity or closed-cavity type. It is understood, of course, that both resonators need not be of the same type. However, the embodiment of FIGURE 4 illustrates that identical resonators can be used to produce the conflicting vibrations or modulating overtones necessary to preclude deafness immunity by supplying each resonator with an actuating fluid pressure slightly different from the fluid pressure being supplied to the other resonator. A pump 49 capable of supplying a fluid under constant pressure is connected by means of pipes 50 or the like to inlet ports 51 and 52 of the valves 53 and 54. Valves 53 and 54 are pressure reducing valves which can be adjusted to produce different fluid pressures at outlet ports 56 and 57. The outlet ports of the valves are connected by means of pipes 59 and 60 or the like to inlet ports 61 and 62 of the resonators 47 and 48 respectively. By supplying two identical resonators with actuating fluids at slightly different pressures ultrasonic sound waves of slightly different frequencies are generated which produce the necessary modulating overtones.

Another embodiment of the present invention is illustrated in FIGURE 5 wherein is shown a single resonator 63. This resonator, of course, can be of the open-cavity or closed-cavity type. A pump 64 capable of supplying an actuating fluid under pressure is connected by means of the pipe 66 or the life to an inlet port 67 of an adjustable pressure reducing valve 68. The setting of the valve can be varied by means of a controller 69 to vary the fluid pressure at outlet port 70 of the valve 68. The outlet port is connected by means of a pipe 71 or the like to inlet port 72 of the resonator 63. By means of varying the pressure of the actuating fluid as it enters the inlet port 72 of the resonator 63 the frequency of the ultrasonic sound wave produced by the resonator will vary accordingly. Periodic changing of the setting of the valve 68 by means of the controller 69 will correspondingly vary the frequency of the ultrasonic sound wave being produced and will therefore preclude the development of a tolerance or deafness immunity by animals within hearing range of the resonator.

From the above description, it will be understood that this invention now provides an inexpensive, efficient ultrasonic sound wave generating system using fluid-operated hollow resonators. The invention also provides apparatus and methods for repelling animals having small brain cavities, and further provides means to preclude deafness immunity which results when the animals are subjected to a single frequency sound wave for a period of time.

Although various minor modifications might be apparent to those skilled in the art, it is to be understood that I wish to embody within the scope of the patent warranted hereon all such embodiments as reasonably and properly come within the scope of my contribution to the art.

I claim as my invention:

1. A resonator to produce ultrasonic sound waves comprising,
    an elongated hollow body member having a tubular side wall and open at one end thereof to form an inlet for receiving a stream of pressurized fluid,
    a baffle situated within said body member and comprising,
        a solid oval-shaped member disposed at an angle to the longitudinal axis of said body member to intersect said longitudinal axis,
        the peripheral edges of said baffle abutting the adjoining interior surface portions of said side wall to partition the interior of said body member into an inlet portion on one side of said baffle and a resonator cavity portion on the opposite side of said baffle,
    means operative to securely mount said baffle on said side wall,
        said side wall having formed therein an aperture of half-ovoid configuration,
        the edges of said aperture including a vertical wall which lies in a first plane which intersects said longitudinal axis of said body member at right angles thereto and an oblique wall which lies in a second plane situated at an acute angle with respect to said longitudinal axis and which intersects said first plane on a line extending perpendicularly with respect to said longitudinal axis, said oblique wall having a front edge and a back edge curvately formed and spaced apart from one another by a distance determined by the thickness of said side wall and the angle of inclination of said oblique wall, and a flat top surface formed on said baffle and disposed in coplanar relation with said oblique wall for directing fluid from said inlet towards said front edge of said aperture and terminating at a front edge disposed in spaced relation with said oblique wall to form an opening therebetween, thereby overcoming pressure build-up and collapse of oscillations at said front edge and sustaining an ultrasonic sound wave.

2. A resonator to produce ultrasonic sound waves comprising, an elongated hollow body member having a tubular side wall and open at one end thereof to form an inlet for receiving a stream of pressurized fluid and closed at an opposite end thereof, a baffle situated within said body member and comprising, a solid oval-shaped member disposed at an angle to the longitudinal axis of said body member to intersect said longitudinal axis, the peripheral edges of said baffle abutting the adjoining interior surface portions of said side wall to partition the interior of said body member into an inlet portion on one side of said baffle and a resonator cavity portion on the opposite side of said baffle, means operative to securely mount said baffle on said side wall, said side wall having formed therein an aperture of half-ovoid configuration, the edges of said aperture including a vertical wall which lies in a first plane which intersects said longitudinal axis of said body member at right angles thereto and an oblique wall which lies in a second plane situated at an acute angle with respect to said longitudinal axis and which intersects said first plane on a line extending perpendicularly with respect to said longitudinal axis, said oblique wall having a front edge and a back edge curvately formed and spaced apart from one another by a distance determined by the thickness of said side wall and the angle of inclination of said oblique wall, and a flat top surface formed on said baffle and disposed in coplanar relation with said oblique wall for directing fluid from said inlet toward said front edge of said aperture, said baffle terminating at front and rear edges thereof, said front edge of said baffle being disposed in spaced relation with said oblique wall to form an opening therebetween and said rear edge of said baffle being disposed in spaced relation with adjoining interior surface portions of said side wall to form an opening therebetween for providing a fluid flow path from said resonator cavity portion to said inlet portion therethrough, thereby overcoming pressure build-up and collapse of oscillations at said front edge of said oblique wall and sustaining an ultrasonic sound wave.

References Cited in the file of this patent
UNITED STATES PATENTS

| | | |
|---|---|---|
| 170,274 | King et al. | Nov. 23, 1875 |
| 992,487 | Ellison | May 16, 1911 |
| 1,826,129 | Gronquist | Oct. 6, 1931 |
| 2,664,850 | Smith | Jan. 5, 1954 |
| 2,971,491 | Yeagley | Feb. 14, 1961 |

FOREIGN PATENTS

| | | |
|---|---|---|
| 152,103 | Switzerland | Apr. 1, 1932 |

OTHER REFERENCES

Newspaper article in Times-Herald (Washington), printed November 30, 1947.